March 1, 1938.  R. HUNT  2,109,642
INSECT EXTERMINATOR
Filed May 7, 1937

INVENTOR,
Robert Hunt,
BY John W. Steward,
ATTORNEY.

Patented Mar. 1, 1938

2,109,642

UNITED STATES PATENT OFFICE 2,109,642

INSECT EXTERMINATOR

Robert Hunt, Hackensack, N. J.

Application May 7, 1937, Serial No. 141,200

14 Claims. (Cl. 43—124)

This invention relates to means for exterminating insects, and especially mosquitoes, which breed most profusely in, on or adjacent to bodies of water, as those which are most if not all of the time static, for instance, ponds, cess-pools, catch-basins, and the like.

In order effectively to exterminate such insects in the several stages of their existence it is necessary not only to render the water poisonous to them but also to provide a poisonous gas stratum directly adjacent the water surface and all other surfaces that adjoin the water body and are close to and above its surface and so are wet or damp, as of the shore of a pond or the walls of a catch-basin or cess-pool. So far as I am aware no expedient which would fully be useful in these respects has ever been provided or even proposed.

My invention contemplates a buoyant insect-exterminating element including insect-toxic ingredients one of which is volatile so that on exposure to air a toxic gas stratum will be formed over the surface of the water in which said element is floated and the other of which is dispersive in and adapted to render the water toxic. Usually these ingredients will be constituents of a plastic mass or masses.

The invention is not broadly concerned with the particular ingredients employed. But for the volatile ingredient napthalene, which is a good insect exterminator, may be used, and for the other toxic ingredient pyrethrum, which is also a good insect exterminator and may undergo dispersion in the water (though it is not water-soluble), may be used; and in the absence of adhesion, as in the case of these particular toxic ingredients, some binder will be used which is soluble in water. There may also be dispersed in the mass matter which is lighter than water so that when released as the result of dissolution of the binder it will rise to the surface and form with the toxic dispersive ingredient a toxic film on such surface.

Usually the volatile material, as napthalene, will be several times the quantity, by weight, of the other ingredients of the mass, combined, and where for this reason or otherwise the mass has greater displacement than water the ultimate buoyant element may be made to have less displacement than water by associating therewith some device that will impart to said element the necessary buoyancy. However, the proportions used are obviously not material insofar as the underlying principles of my invention are concerned.

In many cases, as where the body of water is not always static (as in a catch-basin), the buoyant element is made captive according to the invention, as by a flexible connection to be attached to some relatively fixed element. To provide an assembly which may be deposited in the water, with the buoyant element then captive, I provide the connection with a weight.

In the drawing

Figure 6:
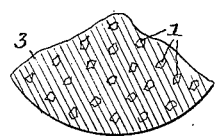

Fig. 6 a magnified sectional view of the mass, illustrating soluble particles which may be interspersed in the mass to form, by dissolving, cells and thus permit the dispersive toxic ingredient to escape.

To form the said mass I mix together napthalene, pyrethrum, and the following ingredients which will go to form a binder capable of dissolution in the water, to wit: tallow, paraffin wax, and epsom salt, the proportions (being all by weight) being as follows, approximately:

| | |
|---|---|
| Napthalene | lbs 3 |
| Pyrethrum solution | oz 1 |
| Tallow | oz 6 |
| Lime | oz ½ |
| Paraffin wax | oz 2 |
| Epsom salt | oz 1 |

Thus the tallow and lime form a saponaceous constituent of the binder comprising them and the wax and salt. When dissolution ensues the wax and the fat (tallow) are freed and will rise to the water surface to form thereon with the pyrethrum the toxic film. The salt, on the dissolution, will leave cells in the mass, as where the particles 1 of salt appear in Fig. 6, and thus permit access of the water to the pyrethrum.

Figure 1:
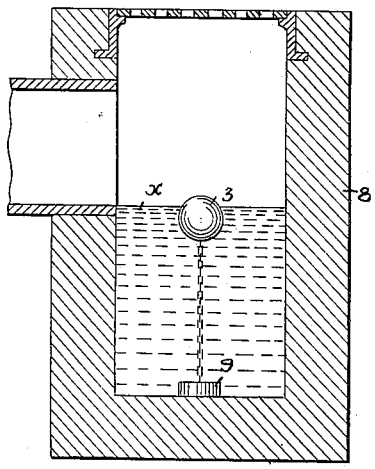
Fig. 1 is a sectional view of a catch-basin and the body of water therein, with one form of the buoyant element in captive state appearing in elevation.
Figure 2:
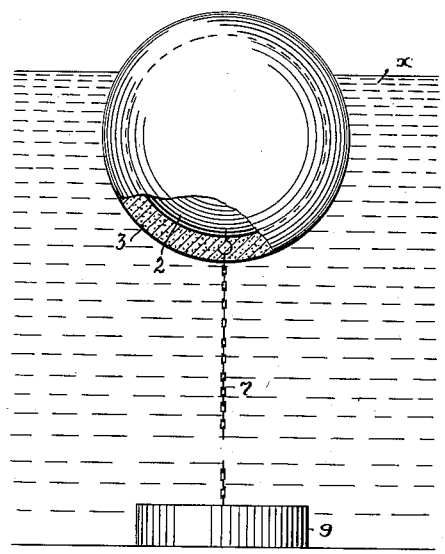
Fig. 2 shows on a larger scale said form of the buoyant element and its weight and connection in elevation, with the water in section.

The plastic mass thus formed has greater displacement than water, wherefore in order to produce an element having the required buoyancy such mass is applied to a body having appreciably less displacement than water. In the example shown by Figs 1 and 2 this body is a sphere 2 of wood and the mass 3 is shown coating the same.

Figure 3:
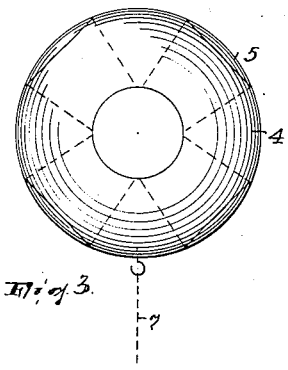
Fig. 3 is a side elevation and Fig. 4 a central section of another form of said element.
Figure 4:
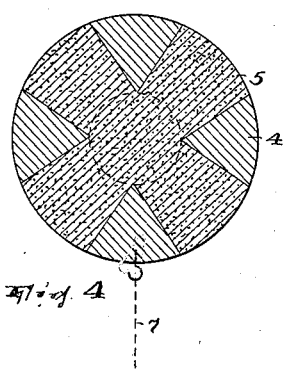
Figure 5:
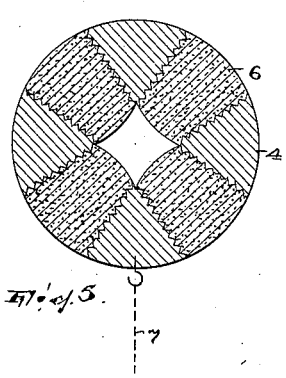
Fig. 5 is a central section of another form of said element.

Instead of coating the body with the mass such body, as 4, Figs. 3 and 4, here also of wood, may be bored radially at any number of preferably equally spaced points, and the space thus formed packed with the mass, as indicated at 5. The borings so formed may, as indicated in Fig. 5, be fluted and the mass be in the form of plugs 6 occupying the borings and interlocked with their flutings, as shown in Fig. 5. In either of these two instances the disposition of the mass should be such that when the buoyant element is floating on the water some of said mass should be exposed to the air.

To render said element captive there is a flexible connector 7 attached in the present instance to what I term the float member (to wit, 2 or 4) and this may be connected to any relatively fixed point, as to some point of the catch-basin 8 in which the buoyant element is placed. However, I prefer, as indicated, to provide an assembly which will include its own anchoring medium and so may be deposited in the water $x$, wherefore a weight 9 is attached to the chain.

If the mass comprises the ingredients and their proportions substantially as stated one advantage will be that the disintegration of the mass will proceed slowly and nevertheless the toxic action will be perfectly effective until the mass has completely wasted away. The hereinbefore mentioned pyrethrum solution may be formed with the aid of kerosene, for example.

Having thus fully described my invention what I claim is:

1. The hereindescribed buoyant insect-exterminating element having a superficial portion thereof including insect-toxic ingredients, one of which is volatile and the other dispersive in the water in which said element is floated, and a water-soluble binder for said ingredients.

2. The hereindescribed buoyant insect-exterminating element having one superficial portion thereof including a volatile insect-toxic ingredient and a binder for said ingredient and another superficial portion thereof including an insect-toxic ingredient and a water-soluble binder for such ingredient.

3. The hereindescribed buoyant insect-exterminating element having a plastic mass affording an exposed surface of said element and including insect-toxic ingredients, one of which is volatile and the other dispersive in the water in which said element is floated.

4. The hereindescribed buoyant insect-exterminating element having a plastic mass affording an exposed surface of said element and including, with matter dispersed in the mass and having less displacement than water, insect-toxic ingredients, one of which is volatile and the other dispersive in the water in which said element is floated.

5. The hereindescribed buoyant insect-exterminating element having a plastic mass affording an exposed surface of said element and including, with water-soluble particles, insect-toxic ingredients, one of which is volatile and the other of which is insoluble but dispersive in the water in which said element is floated.

6. The hereindescribed buoyant insect-exterminating element having plastic mass-portions affording exposed surface-portions of said element and one of said portions including a volatile insect-toxic ingredient and the other including an insect-toxic ingredient which is dispersive in the water in which said element is floated.

7. The hereindescribed buoyant insect-exterminating element having plastic mass-portions affording exposed surface-portions of said element and one of said portions including a volatile insect-toxic ingredient and the other including, with matter dispersed therein and having less displacement than water, an insect-toxic ingredient which is dispersive in the water in which said element is floated.

8. The hereindescribed buoyant insect-exterminating element having plastic mass-portions affording exposed surface-portions of said element and one of said portions including a volatile insect-toxic ingredient and the other including, with water-soluble particles, an insect-toxic ingredient which is dispersive in the water in which said element is floated.

9. An assembly for the purpose described comprising a buoyant element including an insect-toxic ingredient dispersive in the water in which said element is floated, a weight, and a flexible connection connecting the weight and said element.

10. The hereindescribed insect-exterminating element comprising, with a plastic mass including an insect-toxic ingredient which is dispersive in water in which said element is floated and which mass has per se greater displacement than water, a body forming a unit with said mass and having sufficiently less displacement than the mass to render said element buoyant.

11. The hereindescribed insect-exterminating element comprising, with a plastic mass including an insect-toxic ingredient which is dispersive in the water in which said element is floated and which mass has per se greater displacement than water, a body coated by said mass and having sufficiently less displacement than the mass to render said element buoyant.

12. The hereindescribed insect-exterminating element comprising, with a plastic mass including an insect-toxic ingredient which is dispersive in the water in which said element is floated and which mass has per se greater displacement than water, a body bored to receive said mass and having sufficiently less displacement than the mass to render said element buoyant.

13. The hereindescribed insect exterminating element having a plastic mass affording an exposed surface of said element and including, with matter dispersed in the mass and having less displacement than water, an insect-toxic ingredient which is dispersive in the water in which the element is placed.

14. The hereindescribed insect exterminating element having a plastic mass affording an exposed surface of said element and including, with water-soluble particles, an insect-toxic ingredient which is insoluble but dispersive in the water in which said element is placed.

ROBERT HUNT.